United States Patent [19]

Müller et al.

[11] Patent Number: 4,710,629

[45] Date of Patent: Dec. 1, 1987

[54] INFRARED INTRUSION DETECTOR

[75] Inventors: Kurt Müller, Stäfa; Walter Meier, Männedorf, both of Switzerland

[73] Assignee: Cerberus AG, Mannedorf, Switzerland

[21] Appl. No.: 813,508

[22] Filed: Dec. 26, 1985

[30] Foreign Application Priority Data

Jan. 8, 1985 [CH] Switzerland ........................ 00058/85

[51] Int. Cl.[4] ................................................ G01J 5/08

[52] U.S. Cl. ................................ 250/342; 250/252.1; 250/349; 250/353

[58] Field of Search .................... 250/353, 342, 338 R; 340/567, 600; 250/349, 252.1

[56] References Cited

U.S. PATENT DOCUMENTS

| | | | |
|---|---|---|---|
| 3,703,718 | 11/1972 | Berman | 340/567 |
| 4,058,726 | 11/1977 | Paschedag et al. | 250/353 |
| 4,339,748 | 7/1982 | Guscott et al. | 340/555 |
| 4,464,575 | 8/1984 | Cholin et al. | 250/554 |

FOREIGN PATENT DOCUMENTS

| | | |
|---|---|---|
| 0025188 | 1/1983 | European Pat. Off. . |
| 2141228 | 12/1984 | United Kingdom . |

*Primary Examiner*—Janice A. Howell
*Assistant Examiner*—Constantine Hannaher

[57] ABSTRACT

In an infrared intrusion detector which evaluates the body radiation of an intruder by means of a dual radiation sensor having two sensor elements arranged in a differential circuit for emitting an alarm signal, a functional supervision and detection of an attempt at sabotage, e.g., by covering or spraying the entrance window, are achieved by asymmetric irradiation of the two sensor elements through the entrance window by a radiation source. The asymmetry can be achieved by disposing the radiation source outside the plane of symmetry of the sensor elements or by an asymmetrically disposed auxiliary reflector.

19 Claims, 3 Drawing Figures

INFRARED INTRUSION DETECTOR

CROSS REFERENCE TO RELATED CASE

This application is related to the commonly assigned, copending U.S. application Ser. No. 06/818,491, filed Jan. 13, 1986, entitled "INFRARED INTRUSION DETECTOR", and listing as the inventors Kurt Müller, Peter Gruber and Alfred Wüthrich.

BACKGROUND OF THE INVENTION

The present invention broadly relates to infrared intrusion detectors.

Generally speaking, the present invention relates to an infrared intrusion detector having an infrared sensor enclosed by a housing and having an optical arrangement which directs to the sensor infrared radiation entering the housing from specific reception zones through an entrance window which is permeable or transparent to infrared radiation and also having an evaluation circuit which is connected with the sensor and which emits a signal if the output signal of the sensor changes in a specific manner. The housing comprises an infrared radiation source which is designed and disposed in such a manner that the radiation therefrom impinges on or irradiates the sensor after penetrating or traversing the entrance window. The evaluation circuit is designed such that it additionally emits a signal if the sensor receives from the radiation source radiation which is diminished or attenuated in a specific manner.

In other words, the present invention relates to an infrared intrusion detector which comprises a housing having an entrance window defining reception zones or regions of the detector and permeable or transparent to external infrared radiation, an infrared sensor for generating an output signal enclosed in the housing, an optical arrangement for directing external infrared radiation entering the housing through the entrance window from predetermined ones of the reception zones or regions to the sensor, an evaluation circuit connected to the sensor for generating a first alarm signal in response to a predetermined type of change in the output signal, an infrared radiation source for emitting checking infrared radiaton contained in the housing and constructed and arranged such that the checking infrared radiation impinges upon or irradiates the sensor after traversing the entrance window, the evaluation circuit being constructed for additionally generating a second alarm signal in response to a predetermined degree of attenuation of the checking infrared radiation period or interval.

Such infrared intrusion detectors are known for example, from the British Patent Application No. 2,141,228, published Dec. 12, 1984 and serve to detect an object which has penetrated into a supervised or monitored area, e.g., an intruder, by means of the infrared radiation emitted or altered by the latter and to trigger an alarm signal by means of an evaluation circuit. In order to protect the optical arrangement and the sensor of such detectors from damage or dust, and in order to place the detector in an inconspicuous position in the monitored space, in such an arrangement the housing of the detector is closed in the direction of irradiation by an infrared-permeable window which is permeable or transparent to the radiation to be detected, e.g., the body radiation of a human being in the wavelength range around 10 μm, e.g. within the range of 5 to 10 μm. As a result of the additional infrared radiation source, the effect is achieved that the operative condition or state, i.e. the functionality of the detector, is constantly monitored. A malfunction of the sensor or of the evaluation circuit is immediately discovered by the diminution or attenuation of the electrical response signal to an infrared radiation pulse, and triggers a malfunction signal. Likewise, any attempt to sabotage the detector and to render the same insensitive to the detection of an intruder, e.g., by spraying the closure window or the entrance window of the housing with a spray which is impermeable or opaque to infrared radiation, is signalled in the same way as a malfunction.

In order to be able to distinguish a genuine alarm condition caused by an intruder from a malfunction in such previously known detectors, each sensor must be differently irradiated and the evaluation circuit must be able to evaluate and to display the two types of irradiation individually. For this purpose, either the radiation of the additional radiation source can be modulated in a specific manner and the evaluation circuit tuned to such modulation, which requires considerable expenditure in circuitry, or the optical arrangement is set to generate a number of restricted reception fields, as is known e.g. from the U.S. Pat. No. 3,703,718, the U.S. Pat. No. 4,058,726 or the European published Patent No. 25,188, published Jan. 26, 1983, and the evaluation circuit detects specifically and selectively a change in the irradiation of the sensor caused by movement of a burglar through such a reception field or zone and only gives an alarm signal in circumstances in which this change in irradiation has a specific predetermined form. This also requires considerable expenditure.

On the other hand, an infrared intrusion detector is known, from the U.S. Pat. No. 4,339,748 and other publications, in which the infrared sensor is designed as a dual sensor having two sensor elements connected in opposition to one another or antiparallel. On account of the small spatial displacement or separation of the two sensor elements in relation to one another, each optical element accordingly generates a pair of two closely adjacent reception zones, which are sequentially traversed by a burglar with a small temporal difference. As a result of the differential circuit connection of the two sensor elements, in the event of an alarm the evaluation circuit accordingly receives at least one each of a positive pulse and a negative pulse in rapid sequence. These pulses can be evaluated in a simple manner for generating an alarm signal, e.g., by means of a time gate or time window circuit, such evaluation in fact taking place independently of other signals.

In the case of such an infrared intrusion detector equipped with a dual sensor, the use of an additional radiation source directly irradiating the sensor for malfunction or sabotage supervision would however be ineffective, since the additional radiation source would uniformly irradiate the two sensor elements and the output signal of the differential circuit would accordingly be zero, and a malfunction or an attempt at sabotage could therefore not be detected.

SUMMARY OF THE INVENTION

Therefore, with the foregoing in mind, it is a primary object of the present invention to provide a new and improved construction of an infrared intrusion detector which does not exhibit the aforementioned drawbacks and shortcomings of the prior art constructions.

Another and more specific object of the present invention is to provide an infrared intrusion detector which is able to detect and to signal an alarm condition—independently of any functional defect or of an attempt at sabotage—with certainty and reliability and with low apparatus or structural expenditure.

Yet a further significant object of the present invention aims at providing a new and improved construction of an infrared intrusion detector of the character described which is relatively simple in construction and design, extremely economical to manufacture, highly reliable in operation, not subject to breakdown or malfunction and requires a minimum of maintenance and servicing.

Now in order to implement these and still further objects of the invention, which will become more readily apparent as the description proceeds, the infrared intrusion detector of the present invention is manifested by the features that the infrared sensor comprises two sensor elements which are differently irradiated by the infrared radiation source and which are connected in a difference or differential circuit.

In other words, the infrared intrusion detector of the present invention is manifested by the features that the infrared sensor comprises a first sensor element and a second sensor element, the first sensor element being irradiated with the checking infrared radiation by the infrared radiation source in a first predetermined manner and the second sensor element being irradiated with the checking infrared radiation by the infrared radiation source in a second predetermined manner, and difference or differential circuit means interconnect the first sensor element and the second sensor element.

In order to achieve a different irradiation of the two sensor elements, the infrared radiation source can with advantage be disposed asymmetrically in relation to the plane of symmetry of the two sensor elements, e.g., laterally displaced at an edge or in a corner of the radiation entrance aperture of the housing, it being possible for the entrance window to be somewhat set back in the aperture or to be somewhat inclined towards the front of the housing.

With particular advantage there can be provided in the housing an optical focusing system which focuses the radiation from the radiation source on the sensor. For this purpose, an optical element can be used which forms part of the optical arrangement required for receiving external infrared radiation or which is advantageously a separate optical element disposed asymmetrically in relation to the plane of symmetry of the two sensor elements. In the latter case, the radiation source can then also be disposed symmetrically. This arrangement also guarantees a different irradiation of the two sensor elements.

Monitoring or supervision for malfunction can be continuously performed with such an arrangement. For this purpose, only a control circuit is required in the evaluation circuit. This control circuit establishes whether a continuous signal is applied to the input, i.e., by the output of the differential circuit. In this arrangement, the radiation source can with advantage be controlled in direct current steps, without interfering with the alarm evaluation, which responds only to rapid sequences of pulses of reversed polarity but not to sequences of similar pulses. However, monitoring or supervision for malfunction can also be performed periodically during specific test phases. This arrangement entails the advantage of pulsed operation with a signal which is similar to the signal generated by a burglar or intruder.

No substantial changes to the evaluation circuit are necessary, apart from an inverter stage for inhibiting generation of a signal in the test phase if radiation from the radiation source is correctly received, but which generates an alarm if insufficient radiation is received. This is the reverse of the situation in normal operation and monitoring or supervision states. With this arrangement, a special sabotage detection channel is superfluous.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
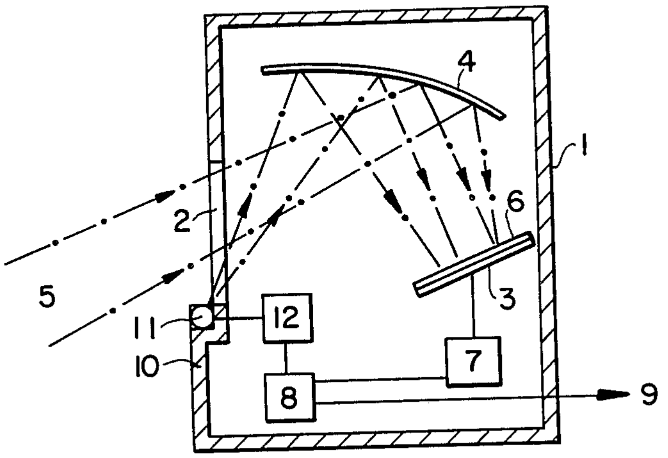
FIG. 1 shows a first intrusion detector in section.

Describing now the drawings, it is to be understood that to simplify the showing thereof only enough of the structure of the infrared intrusion detector has been illustrated therein as is needed to enable one skilled in the art to readily understand the underlying principles and concepts of this invention. Turning now specifically to FIG. 1 of the drawings, the apparatus as illustrated therein by the way of example and not limitation will be seen to comprise an infrared intrusion detector, having a housing 1 containing a radiation entrance window 2, an infrared sensor 3 and an optical arrangement 4. The optical arrangement or element 4 directs radiation from a monitored or supervised reception zone or region 5 to the infrared sensor 3 or focuses that radiation on the infrared sensor 3. The entrance window 2 is of a material permeable or transparent to radiation in at least the wavelength range of human body radiation, i.e. in the range around 10 μm, e.g. between 5 and 15 μm, but advantageously although not necessarily impermeable or opaque to visible light. This material may, for example, consist of a suitable plastic material or a special glass. The sensor 3 is designed to be sensitive in the same wavelength range, for example, as is a pyroelectric sensor. If necessary, a special infrared filter 6 can be provided in front of the sensor 3 for absorbing other wavelengths. The optical arrangement 4 may advantageously comprise a plurality of reflector segments disposed adjacent to one another or several superposed rows of reflector segments, by means of which a number of reception fields for the sensor are defined.

The sensor 3 is designed as a dual sensor with two mutally proximate sensor elements 18 and 19 (see FIG. 3), so that the optical elements define pairs of adjacent reception fields or zones or regions, each of which is associated with a respective one of the two sensor elements 18 and 19. To the sensor 3 there is connected an evaluation circuit which specifically and selectively responds to radiation changes as they are generated or caused by an intruder traversing a pair of reception zones or regions. In the simplest case, this circuit comprises a difference or differential circuit 7 connected with the two sensor elements 18 and 19 of the radiation sensor 3 and to a discriminator circuit 8. The latter triggers an alarm signal by means of a signal line 9, in the event that the sensor output signal exhibits two sufficiently strong pulses of different polarity occurring within a short interval of time, i.e., one positive and one negative pulse, which indicates the movement of an intruder through a pair of reception zones or regions. Instead of being provided in the housing 1 itself, the evaluation circuit or a portion thereof can also be provided separately from the housing in a central signal processing station and can be connected to the housing 1 by conductors.

A detector of this type responds to infrared radiation of the type emitted by a person and subsequently modulated in a specific manner. However, if the entrance window of such a detector is covered with a transparent, i.e., practically invisible but infrared-impermeable or infrared-opaque layer, which can readily be accomplished by means of a spray when the installation is idle during the day, then the sensor no longer receives any evaluatable radiation, so that the alarm system is ineffective on being activated or made live, without the malfunction and the attempt at sabotage being readily discernible.

In order to overcome this disadvantage, the detector shown in FIG. 1 has at the front 10 of the housing 1 an infrared radiation source 11, which emits radiation in the same wavelength range as a human being. The infrared radiation source 11 can, e.g., be designed as a linear resistance or as a PTC resistance, as an incandescent lamp or as an LED. The entrance window 2 is slightly set back or recessed in relation to the infrared radiation source 11, so that radiation therefrom can pass through or traverse the entrance window 2 and, after deflection by the optical arrangement or element 4, can impinge on or irradiate the sensor 3.

The arrangement of the infrared radiation source 11 is now so chosen that it lies outside the plane of symmetry of the two sensor elements 18 and 19. The infrared radiation source 11 can, for example, be fitted so as to be laterally displaced at the edge of the entrance aperture, i.e. off center, or in a corner of the aperture. As a result of this asymmetric arrangement, the two sensor elements are differently irradiated by the radiation source 11, and a signal different from zero occurs at the output of the difference or differential circuit connecting the two sensor elements 18 and 19, provided that all components are operational and the entrance window is permeable or transparent to infrared radiation. In the case of continuous monitoring or supervisory operation, this control signal can be evaluated in a simple manner by means of a control circuit within the discriminator circuit 8, in that a malfunction alarm signal is triggered as soon as the control signal is absent; this takes place separately from and independently of the intrusion alarm evaluation.

A functional test can, however, also be initiated in test phases, for example manually by means of a test key at the detector or in the central signal processing station, or even automatically by a control circuit periodically or at irregular, statistically distributed time intervals. A functional test is preferably carried out automatically on each occasion when the alarm system is activated or made live. It is also advantageous to carry out a functional test not only when the alarm system has been activated or made live, but also when it is idle or not live, when persons might regularly occupy the supervised area and an opportunity thus exists for an attempt at sabotage. Moreover, functional testing can also be initiated and controlled by a suitably programmed microprocessor. The utilization of a programmable control supplementarily permits particularly advantageous further refinements of the inventive concept. Thus, for example, on the first actuation or activation of an alarm system after installation, the intensity or the actuation interval of the radiation source can be determined and stored until the irradiation of the sensor required for triggering of the alarm by an intruder has been reached. In each following functional test, the radiation source is then actuated with these stored operational data. A more differentiated evaluation, for example with several threshold values, also becomes possible in this manner.

It is particularly advantageous if the infrared radiation source 11 is actuated during the test phase by means of a driving circuit 12 for a short time, e.g. for about one second. In this procedure, the sensor is acted upon by infrared radiation in approximately the same manner as if an intruder were traversing a reception zone. In this procedure, the emission of an alarm signal is suppressed during the test phase by logic circuitry in the discriminator circuit 8, while in this phase a malfunction signal is triggered if the modulated infrared radiation is absent.

Figure 2:
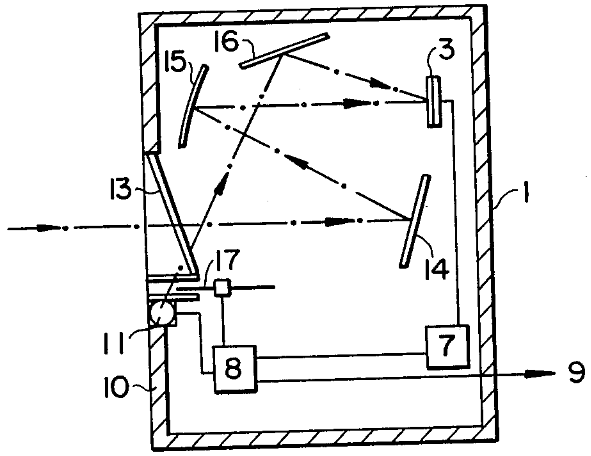
FIG. 2 shows a second intrusion detector in section.
Figure 3:
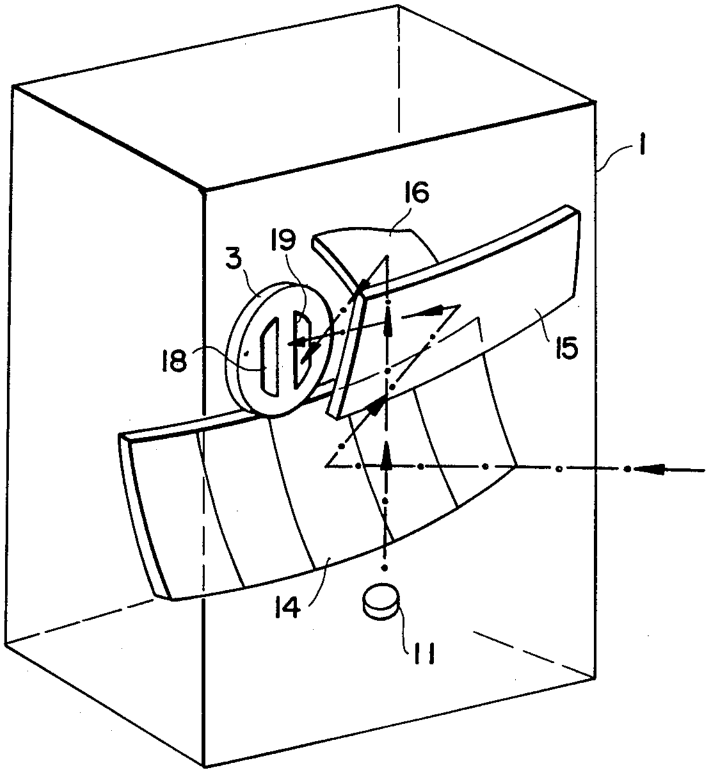
FIG. 3 shows the second intrusion detector in a perspective view.

FIGS. 2 and 3 show a modified embodiment of an infrared intrusion detector, substantially identical components being provided with the same reference numerals. In contradistinction to the previous example, in this case the entrance window 13 is somewhat inclined towards the front of the housing 1, so that it can be better traversed by the infrared radiation from the radiation source 11 and with a larger angle of incidence. The optical arrangement for receiving infrared radiation from the monitored or supervised space or area produces a folded beam path and consists of a series of primary reflector segments 14 for the formation or definition of the individual reception zones or regions and a common secondary reflector 15 for focusing the radiation from all zones or regions onto the sensor 3. The latter is, as already indicated and shown in particular in FIG. 3, designed as a dual sensor with the two adjacent sensor elements 18 and 19 conjointly defining a vertical plane of symmetry and connected in opposition to one another or antiparallel. In order to focus the infrared radiation from the radiation source 11 onto the sensor 3, a separate reflector 16 is provided in the housing 1. This permits focusing the radiation with optimal efficiency, so that sufficient test radiation equivalent to the radiation intensity of an intruder can be produced by a radiation source of minimal power.

In a practical exemplary embodiment, a radiation source of power of only about 0.1 Watt was sufficient, the radiation source being designed as a 50 ohm resistance with an operating temperature of about 100° C. In order to achieve a non-uniform irradiation of the two sensor elements 18 and 19, the reflector 16 is disposed asymmetrically in relation to the plane of symmetry of the two sensor elements 18 and 19. With this arrangement, it is also possible to displace the reflector 16 so far laterally that substantially only one of the two sensor elements 18 and 19 is irradiated. As a result of this asymmetry, a sensor output signal is constantly present in the case of the dual sensor 3 with sensor elements 18 and 19 connected in opposition to one another, when the radiation source 11 is activated.

Instead of switching the operating voltage for the infrared radiation source 11, the actuation and deactuation, i.e. the exposure, of the radiation source can in this case also be accomplished by means of a suitable obturation device or the like, such as a mechanical interrupter 17 or an element with electrically controllable transparency, e.g., a Kerr cell. As a result of this, the relatively slow temperature rise on actuation, which in the case of a resistor element is due to its thermal inertia, is avoided, and a radiation rise with a very steep flank may be achieved, which improves the efficiency. In this procedure, the radiation source 11 can remain permanently active, or alternatively, can be actuated only briefly before release or exposure of the radiation by the interrupter or physical chopper 17, in order to save power.

In the manner described, with infrared intrusion detectors a certain and reliable operation and sabotage supervision may be achieved by the use of a dual sensor and with asymmetric irradiation for test purposes in a simple manner and with minimal additional expenditure, the alarm evaluation operating extremely selectively and unaffected thereby.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An infrared intrusion detector, comprising:
- a housing having an entrance window defining at least one reception zone of the detector;
- said entrance window being transparent to external infrared radiation;
- an infrared dual sensor for generating an output signal in response to externally impinging infrared radiation enclosed in said housing;
- an optical arrangement for directing external infrared radiation entering said housing through said entrance window from predetermined ones of said at least one reception zone to said infrared dual sensor;
- an evaluation circuit connected to said infrared dual sensor for generating a first alarm signal in response to a predetermined type of change in said output signal;
- an infrared radiation source for emitting checking infrared radiation and contained in said housing and constructed and arranged such that said checking infrared radiation irradiates said infrared dual sensor after traversing said entrance window;
- said evaluation circuit being constructed for additionally generating a second alarm signal in response to a predetermined degree of attenuation of said checking infrared radiation to indicate possible sabotage of the infrared intrusion detector;
- said infrared dual sensor comprising a first sensor element and a second sensor element arranged in proximate relationship to one another;
- said first sensor element being irradiated with said checking infrared radiation by said infrared radiation source in a first predetermined manner;
- said second sensor element being irradiated with said checking infrared radiation by said infrared radiation source in a second predetermined manner; and
- differential circuit means interconnecting said first sensor element and said second sensor element.

2. The infrared intrusion detector as defined in claim 1, wherein:
- said differential circuit having an output signal; and
- said evaluation circuit comprising means for generating a malfunction alarm signal when said output signal falls below a predetermined threshold value.

3. The infrared intrusion detector as defined in claim 1, further including:
- means for briefly activating said infrared radiation source at a predetermined radiation temperature for the temporal duration of a predetermined activation interval.

4. The infrared intrusion detector as defined in claim 3, wherein:
- the temporal duration of said predetermined activation interval is on the order of one second; and
- said predetermined radiation temperature being on the order of 100° C.

5. The infrared intrusion detector as defined in claim 1, wherein:
- said evaluation circuit generates said second alarm signal when sabotage of the infrared intrusion detector is carried out at said entrance window.

6. An infrared intrusion detector, comprising:
- a housing having an entrance window defining at least one reception zone of the detector;
- said entrance window being transparent to external infrared radiation;
- an infrared sensor for generating an output signal in response to externally impinging infrared radiation enclosed in said housing;
- an optical arrangement for directing external infrared radiation entering said housing through said entrance window from predetermined ones of said at least one reception zone to said sensor;
- an evaluation circuit connected to said sensor for generating a first alarm signal in response to a predetermined type of change in said output signal;
- an infrared radiation source for emitting checking infrared radiation and contained in said housing and constructed and arranged such that said checking infrared radiation irradiates said sensor after traversing said entrance window;
- said evaluation circuit being constructed for additionally generating a second alarm signal in response to a predetermined degree of attenuation of said checking infrared radiation;
- said infrared sensor comprising a first sensor element and a second sensor element;
- said first sensor element being irradiated with said checking infrared radiation by said infrared radiation source in a first predetermined manner;
- said second sensor element being irradiated with said checking infrared radiation by said infrared radiation source in a second predetermined manner;
- differential circuit means interconnecting said first sensor element and said second sensor element;
- said first and second sensor elements define a plane of symmetry lying therebetween; and
- said infrared radiation source lying outside of said plane of symmetry.

7. An infrared intrusion detector, comprising:
- a housing having an entrance window defining at least one reception zone of the detector;
- said entrance window being transparent to external infrared radiation;

an infrared sensor for generating an output signal in response to externally impinging infrared radiation enclosed in said housing;

an optical arrangement for directing external infrared radiation entering said housing through said entrance window from predetermined ones of said at least one reception zone to said sensor;

an evaluation circuit connected to said sensor for generating a first alarm signal in response to a predetermined type of change in said output signal;

an infrared radiation source for emitting checking infrared radiation and contained in said housing and constructed and arranged such that said checking infrared radiation irradiates said sensor after traversing said entrance window;

said evaluation circuit being constructed for additionally generating a second alarm signal in response to a predetermined degree of attenuation of said checking infrared radiation;

said infrared sensor comprising a first sensor element and a second sensor element;

said first sensor element being irradiated with said checking infrared radiation by said infrared radiation source in a first predetermined manner;

said second sensor element being irradiated with said checking infrared radiation by said infrared radiation source in a second predetermined manner;

differential circuit means interconnecting said first sensor element and said second sensor element;

said housing has a front side;

said entrance window having an edge; and said infrared radiation source being arranged on said edge and on said front side.

8. The infrared intrusion detector as defined in claim 7, wherein:

said entrance window has a centerline; and said infrared radiation source being arranged off said centerline.

9. The infrared intrusion detector as defined in claim 7, wherein:

said optical arrangement defines a reception direction; and said entrance window being set back in said reception direction in relation to said infrared radiation source.

10. The infrared intrusion detector as defined in claim 7, wherein:

said entrance window is inclined relative to said front side of said housing.

11. An infrared intrusion detector, comprising:

a housing having an entrance window defining at least one reception zone of the detector;

said entrance window being transparent to external infrared radiation;

an infrared sensor for generating an output signal in response to externally impinging infrared radiation enclosed in said housing;

an optical arrangement for directing external infrared radiation entering said housing through said entrance window from predetermined ones of said at least one reception zone to said sensor;

an evaluation circuit connected to said sensor for generating a first alarm signal in response to a predetermined type of change in said output signal;

an infrared radiation source for emitting checking infrared radiation and contained in said housing and constructed and arranged such that said checking infrared radiation irradiates said sensor after traversing said entrance widow;

said evaluation circuit being constructed for additionally generating a second alarm signal in response to a predetermined degree of attenuation of said checking infrared radiation;

said infrared sensor comprising a first sensor element and a second sensor element;

said first sensor element being irradiated with said checking infrared radiation by said infrared radiation source in a first predetermined manner;

said second sensor element being irradiated with said checking infrared radiation by said infrared radiation source in a second predetermined manner;

differential circuit means interconnecting said first sensor element and said second sensor element;

a reflector mounted in said housing for deflecting said checking infrared radiation emitted by said infrared radiation source onto said sensor after having traversed said entrance window.

12. The infrared intrusion detector as defined in claim 11, wherein:

said reflector is included in said optical arrangement.

13. The infrared intrusion detector as defined in claim 11, wherein:

said reflector comprises an optical element distinct from said optical arrangement.

14. The infrared intrusion detector as defined in claim 13, wherein:

said first and second sensor elements conjointly define a plane of symmetry; and said reflector being arranged asymmetrically in relation to said plane of symmetry.

15. The infrared intrusion detector as defined in claim 14, wherein:

said reflector is arranged to irradiate exclusively one sensor element of said first and second sensor elements.

16. An infrared intrusion detector, comprising:

a housing having an entrance window defining at least one reception zone of the detector;

said entrance window being transparent to external infrared radiation;

an infrared sensor for generating an output signal in response to externally impinging infrared radiation enclosed in said housing;

an optical arrangement for directing external infrared radiation entering said housing through said entrance window from predetermined ones of said at least one reception zone to said sensor;

an evaluation circuit connected to said sensor for generating a first alarm signal in response to a predetermined type of change in said output signal;

an infrared radiation source for emitting checking infrared radiation and contained in said housing and constructed and arranged such that said checking infrared radiation irradiates said sensor after traversing said entrance window;

said evaluation circuit being constructed for additionally generating a second alarm signal in response to a predetermined degree of attenuation of said checking infrared radiation;

said infrared sensor comprising a first sensor element and a second sensor element;

said first sensor element being irradiated with said checking infrared radiation by said infrared radiation source in a first predetermined manner;

said second sensor element being irradiated with said checking infrared radiation by said infrared radiation source in a second predetermined manner;

differential circuit means interconnecting said first sensor element and said second sensor element;

obturation means for briefly transmitting said checking infrared radiation.

17. The infrared intrusion detector as defined in claim 16, wherein:

said obturation means comprises a mechanical shutter.

18. The infrared intrusion detector as defined in claim 16, wherein:

said obturation means comprises an element of electrically controllable transmissivity.

19. An infrared intrusion detector, comprising:

a housing having an entrance window defining at least one reception zone of the detector;

said entrance window being transparent to external infrared radiation;

an infrared sensor for generating an output signal in response to externally impinging infrared radiation enclosed in said housing;

an optical arrangement for directing external infrared radiation entering said housing through said entrance window from predetermined ones of said at least one reception zone to said sensor;

an evaluation circuit connected to said sensor for generating a first alarm signal in response to a predetermined type of change in said output signal;

an infrared radiation source for emitting checking infrared radiation and contained in said housing and constructed and arranged such that said checking infrared radiation irradiates said sensor after traversing said entrance window;

said evaluation circuit being constructed for additionally generating a second alarm signal in response to a predetermined degree of attenuation of said checking infrared radiation;

said infrared sensor comprising a first sensor element and a second sensor element;

said first sensor element being irradiated with said checking infrared radiation by said infrared radiation source in a first predetermined manner;

said second sensor element being irradiated with said checking infrared radiation by said infrared radiation source in a second predetermined manner;

differential circuit means interconnecting said first sensor element and said second sensor element;

said infrared radiation source emitting said checking infrared radiation with a spectrum of wavelengths; and said spectrum of wavelengths having a maximum intensity of radiation between a wavelength of 5 $\mu m$ and a wavelength of 15 $\mu m$.

* * * * *

UNITED STATES PATENT AND TRADEMARK OFFICE
CERTIFICATE OF CORRECTION

PATENT NO. : 4,710,629

DATED : December 1, 1987

INVENTOR(S) : KURT MüLLER et al

It is certified that error appears in the above-identified patent and that said Letters Patent is hereby corrected as shown below:

Column 4, line 61, please delete "mutally" and insert --mutually--

Column 10, line 2, please delete "widow" and insert --window--

Signed and Sealed this

Tenth Day of May, 1988

*Attest:*

DONALD J. QUIGG

*Attesting Officer*

*Commissioner of Patents and Trademarks*